United States Patent [19]

Mori

[11] 4,057,135

[45] Nov. 8, 1977

[54] SELF-ADJUSTING RELEASE MECHANISM FOR A CLUTCH ASSEMBLY

[75] Inventor: Masanori Mori, Toyota, Japan

[73] Assignee: Aisin Seiki Kabushiki Kaisha, Kariya, Japan

[21] Appl. No.: 719,269

[22] Filed: Aug. 31, 1976

[30] Foreign Application Priority Data

Sept. 19, 1975 Japan .................................. 50-12939
June 15, 1976 Japan ................................. 51-77654

[51] Int. Cl.$^2$ .......................................... F16D 13/75
[52] U.S. Cl. ............................. 192/111 A; 188/196 B
[58] Field of Search ............... 192/111 A; 188/196 B, 188/71.8

[56] References Cited

U.S. PATENT DOCUMENTS

| 2,187,636 | 1/1940 | Story | 192/111 A X |
| 2,421,869 | 6/1947 | Brock | 192/111 A X |

FOREIGN PATENT DOCUMENTS

| 46-24921 | 8/1968 | Japan | 192/111 A |

Primary Examiner—Benjamin W. Wyche

Attorney, Agent, or Firm—Finnegan, Henderson, Farabow & Garrett

[57] ABSTRACT

A self-adjusting release mechanism for a clutch assembly for automatically adjusting the increased or decreased displacement of a release bearing in a clutch mechanism. The release bearing is normally spaced from release levers of the clutch mechanism but engageable with the release levers to effect disengagement of the driving connection between driving and driven shafts when the clutch assembly is actuated. The self-adjusting release mechanism has a retainer mechanically connected to a clutch pedal of the assembly. The retainer has a hollow portion with at least one end open through which is positioned one end of a rod member that has its other end mechanically connected to the release bearing. A cam member is disposed in the hollow portion between the retainer and the rod member for selective engagement and disengagement with the rod member in response to the relative movement between the cam and the retainer. The cam member is biased toward disengagement from the rod member, while a pair of springs urge the cam member to a predetermined position when the cam member is disengaged from the rod member. Another spring biases the rod member in a clutch-disengaging direction.

9 Claims, 3 Drawing Figures

SELF-ADJUSTING RELEASE MECHANISM FOR A CLUTCH ASSEMBLY

BACKGROUND OF THE INVENTION

This invention relates to a clutch assembly and, more particularly, to a self-adjusting release mechanism for a clutch assembly.

In the prior art, there has been developed a self-adjusting release mechanism for a clutch assembly which includes a first member responsive to a clutch pedal, a second member operatively connected with a release bearing in a clutch mechanism and a third member selectively connecting and disconnecting the first and second members for adjusting a gap formed between a release lever in the clutch mechanism and the clutch release bearing. The third member has racks which are adapted for engagement with one of the first and second members. The third member is normally urged by a leaf spring in a disengaging direction.

In the above conventional mechanism, an inner wall of its housing is used to limit the disengaging movement of the third member due to the leaf spring. In other words, the outer periphery of the third member is brought into contact with the inner wall because of the bias of the leaf spring. This mechanism further teaches that the inner wall has a recess into which the third member is urged by the leaf spring for effecting disengagement of the racks of the third member from the first or second member. Upon this disengagement, the first and second members move relative to one another so as to adjust the gap between the clutch release lever and the clutch release bearing. After the gap has been adjusted, the third member has to jump a shoulder defining the recess in the wall against the biasing force of the leaf spring in order to re-establish the engagement between the third member and the first or second member.

The structure of the conventional mechanism previously referred to does not produce satisfactory results in that there is considerable wearing of the inner wall of the housing and the outer periphery of the third member and the first or second members due to the sliding movement between these engaging portions. Therefore, the proper and accurate adjusting function of the release mechanism is not always maintained and cannot be depended upon. The above construction of the conventional release mechanism also causes a drag on the manipulating or depression force on the clutch pedal due to the sliding resistance generated between the inner wall of the housing and the third member.

SUMMARY OF THE INVENTION

Accordingly, it is an object of this invention to provide a self-adjusting release mechanism for a clutch assembly which obviates the various deficiencies of the conventional release mechanisms.

It is another object of this invention to provide a self-adjusting release mechanism for a clutch assembly which is durable by reducing the number of sliding engageable elements.

It is still another object of this invention to provide a self-adjusting release mechanism for a clutch assembly which is actuated by a relatively small manipulating or depression force on a clutch pedal.

It is a further object of this invention to provide a self-adjusting release mechanism for a clutch assembly which minimizes an idle or accidental actuating stroke of the clutch pedal.

It is still a further object of this invention to provide a self-adjusting release mechanism for a clutch assembly which ensures that its elements are maintained in their predetermined or desired positions during clutch engagement. Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the clutch assembly of the invention comprises (1) clutch means for normally effecting a driving connection between the shafts; (2) clutch release levers actuable for disengaging the driving connection normally effected by the clutch means between the shafts; (3) clutch release bearing means normally spaced from the release levers and engageable with the release levers for effecting the disengagement of the driving connection between the shafts; (4) means for actuating the clutch assembly; and (5) means for automatically adjusting the space between the clutch release levers and the clutch release bearing means to a predetermined distance, the automatically adjusting means including (a) first retainer means mechanically connected to the actuating means and having a hollow portion therein open at least at one end; (b) a rod member mechanically connected to the clutch release bearing means for moving the clutch release bearing means relative to the clutch release levers and having a portion positioned through the open end of the first retainer means; (c) cam means disposed in the hollow portion between the first retainer means and the rod member for selective engagement and disengagement with the rod member in response to the relative movement between the cam means and the first retainer means, the cam means being under bias toward disengagement from the rod member; (d) first spring means for urging the cam means to a predetermined position when the cam means is disengaged from the rod member; and (e) second spring means for biasing the rod member in the clutch-disengaging direction.

Preferably, the first retainer means has cam surfaces for urging the cam means into engagement with the rod member, and wherein the clutch assembly further comprises leaf spring means for providing the bias toward disengagement of the cam means from the rod member.

It is also preferred that the clutch assembly further comprises second retainer means slidable relative to the rod member and operatively connected to the cam means, and wherein the first spring means includes a pair of springs acting on opposing sides of the second retainer means, the biasing forces of the pair of springs being balanced when the retainer means is in a predetermined neutral position.

Finally, it is preferred that the clutch assembly further include a wire mechanically connecting the first retainer means to the actuating means, and third spring means for urging the wire to a taut condition, the first retainer means thereby being urged to a predetermined position.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings.

Figure 1:
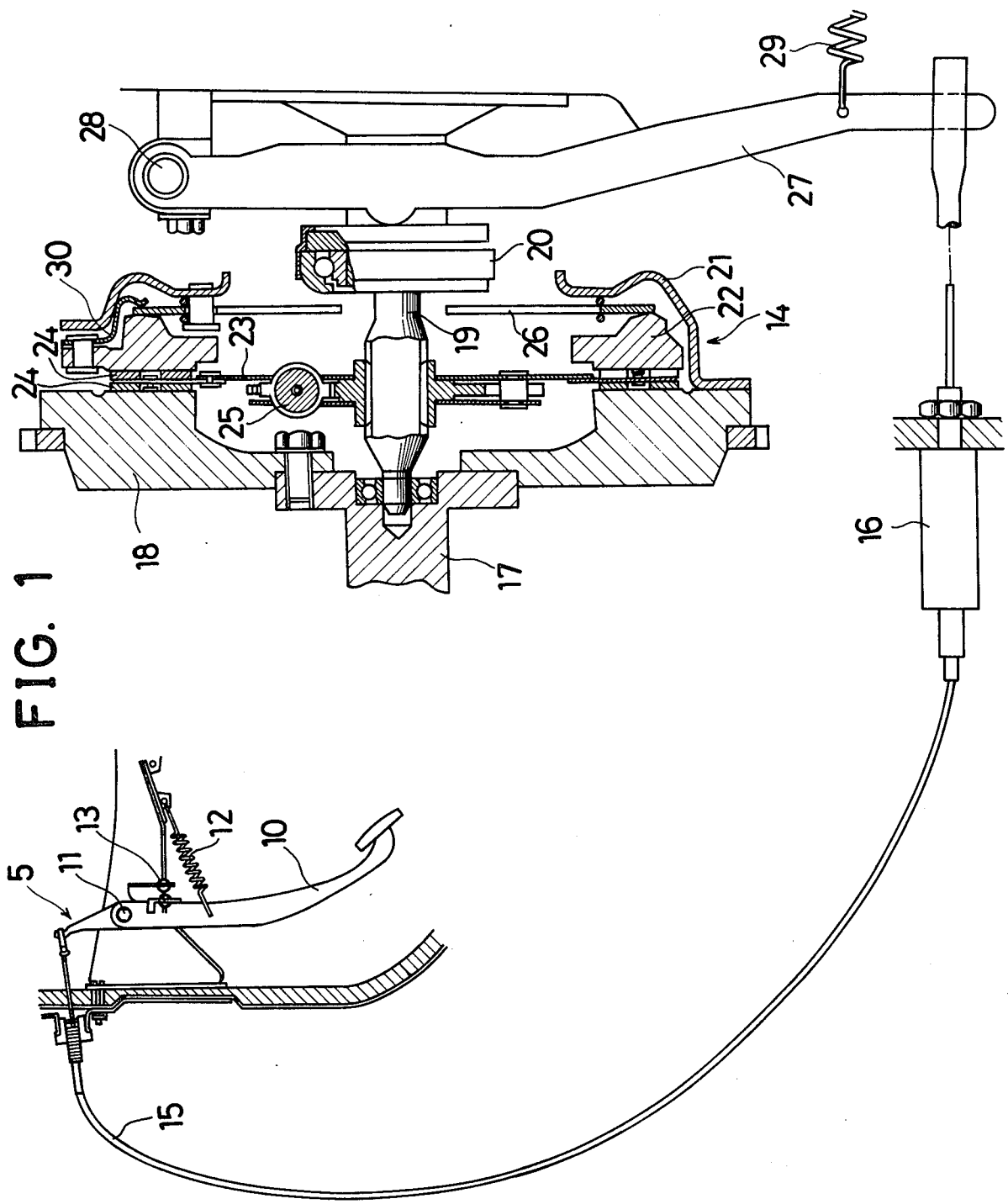
FIG. 1 is a diagrammatic view of the clutch assembly constructed in accordance with the teachings of this invention with portions of the assembly shown in cross-section.

Referring to FIG. 1, in accordance with the invention, the clutch assembly connects driving and driven shafts and comprises a clutch mechanism 14, means 5 for actuating the clutch assembly, and a self-adjusting mechanism 16.

Preferably, the means 5 for actuating the clutch assembly comprises a clutch pedal 10 pivotally mounted on a stationary part of a vehicle body through a suitable pivot means-11. A return spring 12, which is positioned between the clutch pedal 10 and the vehicle body, biases the clutch pedal 10 in the counterclockwise or engaging direction so that the clutch pedal 10 is normally brought into contact with a stop means 13 mounted on the vehicle body. The clutch pedal 10 is operatively connected to the clutch mechanism 14 through a wire cable 15 and the self-adjusting mechanism 16.

In accordance with the invention, the clutch mechanism 14 comprises clutch means for normally effecting a driving connection between the shafts, clutch release levers actuable for disengaging the driving connection normally effected by the clutch means between the shafts, and clutch release bearing means normally spaced from the release levers and engageable with the release levers for effecting the disengagement of the driving connection between the shafts.

In the preferred embodiment, a flywheel 18 is secured to a driving shaft 17, and a clutch release bearing 20 is disposed about an output or driven shaft 19. A clutch cover 21 and a pressure plate 22 are connected to the flywheel 18 for rotation therewith. A driven disc 23 has on its opposite sides inner and outer friction facings 24. Cushioning springs 25 are splined to the output shaft 19 and are positioned between the flywheel 18 and the pressure plate 22. A clutch release lever 26 is disposed on the cover 21 so that its outer periphery normally applies a force for clutch engagement on the pressure plate 22 while its inner periphery is normally spaced from the release bearing 20.

A clutch release fork 27 is pivotally mounted through a pivot pin 28 on a housing of the clutch mechanism 14 and is normally biased in the counter-clockwise or engaging direction by a return spring 29 which is arranged between the clutch release fork 27 and the clutch housing. The lower end of the clutch release fork 27 is mechanically connected to the self-adjusting mechanism 16 so that the clutch release fork 27 is moved in the clockwise or disengaging direction against the biasing force of the spring 29 when the clutch pedal 10 is depressed.

The clutch release fork 27 is also operatively connected to the clutch release bearing 20 so that a predetermined clockwise movement of the release fork 27 brings the clutch release bearing 20 into contact with the inner periphery of the clutch release lever 26. By this movement, the outer periphery of the clutch release lever 26 is urged in the direction in which the pressure plate 22 is moved through spring clips 30 for effecting a clutch disengagement with the driven disc 23. Since clutch mechanism 14 may be constructed in a manner such as that taught in U.S. Pat. No. 3,235,049, any further explanation of the clutch operation can be obtained by reference to that disclosure.

In accordance with the invention, the self-adjusting mechanism 16 comprises means for automatically adjusting the space between the clutch release levers 26 and the clutch release bearing means 20 to a predetermined distance. The automatically adjusting means includes: first retainer means mechanically connected to the clutch-actuating means 5 and having a hollow portion therein open at least at one end; a rod member mechanically connected to the clutch release bearing means 20 for moving the clutch release bearing means 20 relative to the clutch release levers 26 and having a portion positioned through the open end of the first retainer means; cam means disposed in the hollow portion between the first retainer means and the rod member for selective engagement and disengagement with the rod member in response to the relative movement between the cam means and the first retainer means, the cam means being under bias toward disengagement from the rod member; first spring means for urging the cam means to a predetermined position when the cam means is disengaged from the rod member; and second spring means for biasing the rod member in the clutch-disengaging direction.

Figure 2:
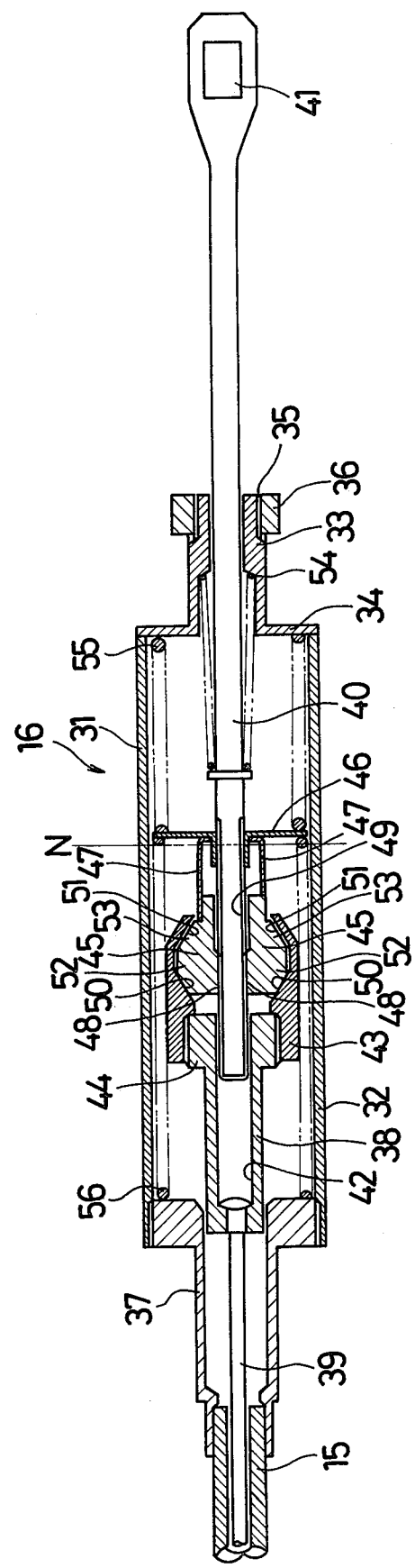
FIG. 2 is a cross-sectional view of one embodiment of the self-adjusting release mechanism of the clutch assembly of FIG. 1.

Referring now to the preferred embodiment shown in FIG. 2, the self-adjusting mechanism 16 includes a housing 31 having a large cylindrical section 32 and a small section 33. The large section 32 has a first end oriented toward the release fork 27 and a second end oriented toward the clutch-actuating means 5, the first and second ends being hereafter referred to as right and left ends, respectively, as shown in FIG. 2.

The small section 33 has a flange 34 which is secured to the right open end of the large section 32. On the outer periphery of the small section 33 is a screw portion 35 into which a nut 36 is threaded to secure the housing 31 to the clutch mechanism housing. The large section 32 has a left open end into which is threaded an end cable 37. The wire cable 15, connected at one end to the actuating means 5, is secured at its other end through the end cable 37. The end cable 37 is provided with a hollow portion therein for slidably receiving an end wire 38 which is connected to an end of a wire 39 of the wire cable 15.

Preferably, the rod member of the self-adjusting mechanism 16 comprises a rod 40 formed with a right end having a slit 41 into which the clutch release fork 27 (FIG. 1) of the clutch mechanism 14 is positioned. This mechanically connects the rod 40 to the clutch release bearing means 20 for moving the clutch release bearing means 20 relative to the clutch release levers 26. The other or left end of the rod 40 extends to an axial bore 42 of the end wire 38, with the rod 40 being slidable relative to the end wire 38.

Preferably, the first retainer means of the self-adjusting mechanism 16 comprises a retainer 43 which is threaded at one end onto an enlarged portion 44 of the end wire 38. The retainer 43 has a hollow portion through which is positioned the rod 40.

Preferably, the cam means of the self-adjusting mechanism 16 comprises a pair of cam members 45 disposed in the hollow portion of the retainer 43 between a concave inner surface of the retainer 43 and the outer surface of the rod 40 for selective engagement and disengagement with the rod 40 in response to the relative movement between convex outer surfaces of the cam members 45 and the retainer 43.

Preferably, a second retainer means 46 is operatively connected to the cam members 45 through means of leaf springs 47 which urge the cam members 45 outwardly away from the rod 40. The second retainer means 46 is arranged between an inner wall of the large section 32 and the rod 40, and is slidable relative to the rod 40 and the inner wall.

It is preferred that the cam members 45 have racks or teeth 48 on the surface facing the rod 40 which are adapted for engagement with racks or teeth 49 provided on the outer periphery of the rod 40. The concave inner surface of the retainer 43 has first cam surfaces 50 and second cam surfaces 51 which are adapted for engagement, respectively, with first and second portions 52 and 53 of the convex outer surfaces of the cam members 45. The first cam surfaces 50 are spaced from the second cam surfaces 51 of the retainer 43 by a predetermined distance so that the racks 48 of the cam members 45 are disengaged from the racks 49 of the rod 40 by the biasing force of the leaf springs 47 when the cam members 45 are moved relative to the retainer 43 from their first position wherein the first portions 52 of the cam members 45 engage with the first cam surfaces 50 of the retainer 43 to their second position wherein the second portions 53 of the cam members 45 engage the second cam surfaces 51 of the retainer 43. During operation the cam members 45 also move in a reverse direction from their second position to their first position as explained hereafter.

Preferably, the second spring means of the self-adjusting mechanism 16 comprises a spring 54 for urging the rod 40 toward the left. The spring 54 has one end seated against a shoulder on the small section 33 of the housing and the other end seated against a shoulder on the rod 40, the biasing force of the spring 54 being greater than that of the return spring 29 of the clutch mechanism 14 shown in FIG. 1.

Preferably, the first spring means for urging the cam means comprises a spring 55 inserted between the second retainer means 46 and the flange 34 for urging the second retainer means 46 toward the left and a spring 56 inserted between the second retainer means 46 and the end cable 37 for urging the second retainer means 46 toward the right. The biasing forces of the springs 55 and 56 are balanced when the second retainer means 46 is in a neutral position designated in FIG. 2 as N.

As will be described hereinafter, the structure of the self-adjusting mechanism 16 corrects the space between the clutch release lever 26 and the clutch release bearing 20 to a predetermined distance, upon operation of the clutch assembly, when one of several conditions exist, i.e., when the space between the clutch release lever 26 and the clutch release bearing 20 is less than the predetermined distance or when the space between the clutch release lever 26 and the clutch release bearing 20 is larger than the predetermined distance. The various interactions and movements of the elements of the clutch assembly under the above conditions during operation when the clutch pedal 10 is depressed or released is now explained in greater detail.

Referring now to FIGS. 1 and 2, during operation of the clutch assembly when the clutch pedal 10 is depressed downwardly or in the clockwise direction, the wire 39 of the wire cable 15, the end wire 38, and the retainer 43 are moved toward the left. The rod 40, the cam members 45, the leaf springs 47, and the second retainer means 46 follow the leftward movement of the retainer 43 because of the biasing forces of the springs 54 and 55. This results in the leftward or clockwise rotation of the clutch release fork 27 so that the clutch release bearing 20 is moved toward the clutch release lever 26.

If the clutch release bearing 20 contacts the clutch release lever 26 before the second retainer means 46 is moved left to the neutral position N., i.e., the gap between the clutch release bearing 20 and the clutch release lever 26 is less than the predetermined distance, the biasing force of the clutch release lever 26 limits and prevents the leftward movements of the clutch release bearing 20, the fork 27 and the rod 40. Due to the engagement between the racks 49 of the rod 40 and the racks 48 of the cam members 45, the cam members 45, the leaf springs 47 and the second retainer means 46 are prevented from also moving leftwardly.

However, since retainer 43 is continuously moved toward the left by the pull from the wire cable 15, the first cam surfaces 50 of the retainer 43 are moved leftwardly so as to disengage from the first portions 52 of cam members 45. Thus the cam members 45 are urged outwardly by the leaf springs 47 so that the racks 48 of the cam members 45 disengage from the racks 49 of the rod 40. The cam members 45, the leaf springs 47, and the second retainer means 46 are moved again leftwardly relative to the rod 40 by the biasing force of the spring 55.

When the second retainer means 46 reaches its neutral position N, the biasing forces of the springs 55 and 56 are balanced so that the second retainer means 46, the cam members 45 and the leaf springs 47 are prevented from moving further to the left. By the further movement of the retainer 43, the second cam surfaces 51 of the retainer 43 are brought into contact with the second portions 53 of the cam members 45 whereby the cam members 45 are urged inwardly against the outward force of the leaf springs 47 to again establish engagement between the racks 48 of the cam members 45 and the racks 49 of the rod 40.

It should be noted that the racks 48 and 49 re-engage when the cam members 45 are moved relative to the retainer 43 by the distance between the neutral position of the second retainer means 46 and the position when the racks 48 of the cam members 45 are disengaged from the racks 49 of rod 40. After the above re-engagement, the rod 40, the cam members 45, the leaf springs 47, and the second retainer means 46 will move together with the retainer 43 so that the outer periphery of the clutch release lever 26 is urged to the clutch release position.

When the clutch pedal 10 is released, the clutch release bearing 20, the fork 27, the rod 40, the cam members 45, the leaf springs 47, the retainers 46 and 43, the end wire 38, the wire 39, and the clutch pedal 10 are urged to return to their original positions by the biasing forces of the clutch release lever 26 and the springs 29, 56 and 12. When the second retainer means 46 is returned in its neutral position N, there is no further biasing force of the clutch release lever 26 exerted on the clutch release bearing 20 and the biasing forces of springs 55 and 56 are balanced. Therefore, the spring 54 prevents the further rightward movements of the clutch release bearing 20, the fork 27, the rod 40, cam members 45, leaf springs 47, and the second retainer means 46. However, the retainer 43 continues to move toward the right by the biasing force of the return spring 12.

Therefore, the second cam surfaces 51 of the retainer 43 are moved away from or rightwardly relative to the second portions 53 of the cam members 45. This results in the racks 48 of the cam members 45 disengaging from the racks 49 of the rod 40 by the outward urging force of the leaf springs 47. At this time, there is no relative movement between the cam members 45 and the rod 40 because the biasing forces of the springs 55 and 56 are balanced and the cam members 45 are disengaged from the retainer 43 and the rod 40.

As the first cam surfaces 50 of the retainer 43 come into contact with the first portions 52 of the cam members 45 by the further rightward movement of the retainer 43, the cam members are urged again inwardly so that the racks 48 of the cam members 45 re-engage the racks 49 of the rod 40. Thereafter, the cam members 45, the leaf springs 47, the second retainer means 46 and the rod 40 will move together rightwardly with the retainer 43 so that the clutch release fork 27 and the clutch release bearing 20 are returned to their original positions. Thus, the space between the clutch release bearing 20 and the clutch release lever 26 is maintained at the predetermined distance which corresponds to the distance between the neutral position N of the second retainer means 46 and the original position of the second retainer means 46 illustrated in FIG. 2.

If, during the operation of the clutch assembly when the clutch pedal 10 is depressed, the clutch release bearing 20 does not contact the clutch release lever 26 by the time the second retainer means 46 is moved to the neutral position N, namely, i.e., the gap between the clutch release bearing 20 and the clutch release lever 26 is larger than the predetermined distance, the clutch release bearing 20, the fork 27, the rod 40, the cam members 45, the leaf springs 47, and the second retainer means 46 continue to follow the leftward movement of the retainer 43 because of the biasing force of the spring 54. When the clutch release bearing 20 contacts the clutch release lever 26, the biasing force of the clutch release lever 26 limits and prevents the movements of the clutch release bearing 20, the fork 27, the rod 40, the cam members 45, the leaf springs 47, and the second retainer means 46, However, since the retainer 43 continues leftwardly by the pull of the wire cables, the relative movement between the retainer 43 and the cam members 45 causes the disengagement between the racks 48 of the cam members 45 and the racks 49 of the rod 40 by the biasing force of the leaf springs 47. Under this condition, the cam members 45, the leaf springs 47 and the second retainer means 46 are moved toward the right by the biasing force of the spring 56 because there is a gap between the second cam surfaces 51 of the retainer 43 and the second portions 53 of the cam members 45. The second portions 53 of the cam members 45 eventually contact the second cam surfaces 51 of the retainer 43. Consequently, the cam members 45 are urged inwardly by the second cam surfaces 51 of the retainer 43 against the outward force of the leaf springs 47 so that the racks 48 of the cam members 45 re-engage with the racks 49 of the rod 40.

It should be noted that the distance of the rightward movement of the cam members 45 is less than that distance between the neutral position of the second retainer means 46 and the position of the second retainer means 46 when the racks 48 of the cam members 45 are disengaged from the racks 49 of the rod 40. As is clear from above, the racks 48 of the cam members 45 move rightwardly toward the neutral position of the second retainer means 46 from the position when the racks 48 were disengaged from racks 49. After the re-engagement, the rod 40, the cam members 45, the leaf springs 47, and the second retainer means 46 will move leftwardly together with the retainer 43 to effect clutch disengagement.

When the clutch pedal 10 is released, the clutch release bearing 20, the fork 27, the rod 40, the cam members 45, the leaf springs 47, the retainers 46 and 43, the end wire 38 and the wire 39 return toward their original positions. When the elements return to positions corresponding to the positions when the racks 48 of the cam members 45 were engaged with the racks 49 of the rod 40 during depression of the clutch pedal 10, there is no biasing force of the clutch release lever 26 being exerted on the clutch release bearing 20. Accordingly, the clutch release bearing 20, the fork 27, the rod 40, the cam members 45, the leaf springs 47, and the second retainer means 46 are prevented from further moving rightwardly by the leftward biasing force of the spring 54. However, the retainer 43 moves rightwardly relative to the cam members 45 to establish disengagement between the racks 48 of the cam members 45 and the racks 49 of the rod 40.

If the second retainer means 46 does not return to its neutral position upon the above disengagement, the cam members 45, the leaf springs 47, and the second retainer means 46 follow the return rightward movement of the retainer 43 because of the rightward biasing force of the spring 56 relative to the rod 40. Although the movement of the cam members 45 is stopped when the second retainer means 46 reaches its neutral position, the retainer 43 continues to move rightwardly under action of the return spring 12 and the wire cable 15 so that the first cam surfaces 50 of the cam members 45 are brought into contact with the first portions 52 of the retainer 43 to again establish the engagement between the racks 48 of the cam members 45 and the racks 49 of the rod member 40. Thereafter, the cam members 45, the leaf springs 47, the second retainer means 46 and the rod 40 will move rightwardly together with the retainer 43 so that the clutch release bearing 20 is spaced from the clutch release lever 26 by the predetermined distance.

If the gap between the clutch release bearing 20 and the clutch release lever 26 is considerably large, the clutch release bearing 20, the fork 27, the rod 40, the cam members 45, the leaf springs 47, and the second retainer means 46, as previously described when the clutch pedal 10 is depressed, will follow the movement of the retainer 43 because of the biasing force of the spring 54 beyond the neutral position of the second retainer means 46. When the gap is considerably large, the sum of the biasing forces of the springs 56 and 29 is such that it balances with the sum of the biasing force of the springs 54 and 55 before the clutch release bearing 20 is brought into contact with the clutch release lever 26. Therefore, the clutch release bearing 20, the fork 27, the rod 40, the cam members 45, the leaf springs 47, and the second retainer means 46 are limited from further leftward movement even without the biasing force of the clutch release lever 26. This means, as previously described, that the racks 48 of the cam members 45 become disengaged from the racks 49 of the rod 40 because of the continued leftward movement of the retainer relative to the cam members 45 and the outwardly biasing force of the leaf springs 47.

If, at this time, there is the gap between the second cam surfaces 51 of the retainer 43 and the second portions 53 of the cam members 45, the cam members 45, the leaf springs 47, and the second retainer means 46 are moved toward the right correspondingly by the biasing force of the spring 56 against the spring 55. Since the clutch release bearing 20 and the clutch release lever 26 are not in contact at this time, the rod 40, the clutch release bearing 20, and the fork 27 are urged leftwardly by the biasing force of the spring 54 until the clutch release bearing 20 engages with the clutch release lever 26. Thereafter, the second portions 53 of the cam members 45 are brought into contact with the second cam surfaces 51 of the retainer 43 to thereby establish engagement between the racks 48 of the cam members 45 and the racks 49 of the rod 40 against the outward force of the leaf springs 47.

It will be apparent that the racks 48 re-engage with the racks 49 when cam members 45 are moved rightwardly relative to the rod 40 by a distance which is equal to the sum of the distance by which the cam members 45 are moved rightwardly by the spring 56 and the distance by which the rod 40 is leftwardly moved by the spring 54. After re-engagement, the rod 40, the cam members 45, the leaf springs 47, and the second retainer means 46 will move leftwardly together with the retainer 43 to effect clutch disengagement.

When the clutch pedal 10 is released, the clutch release bearing 20, the fork 27, the rod 40, the cam members 45, the leaf springs 47, the retainers 46 and 43, the end wire 38, the wire 39 and the clutch pedal 10 return toward their original positions. When the elements return to positions corresponding to the positions when the racks 48 of the cam members 45 are re-engaged with the racks 49 of the rod 40 during depression of the clutch pedal 10, there is no biasing force of the clutch release lever 26 being exerted on the clutch release bearing 20, the fork 27, the rod 40, the cam members 45, the leaf springs 47, and the second retainer means 46. Since the retainer 43 continues to move rightwardly relative to the cam members 45, the racks 48 of the cam members 45 disengage with the racks 49 of the rod 40.

If the second retainer means 46 has not returned to its neutral position upon the above disengagement, the cam members 45, the leaf springs 47, and the second retainer means 46 follow the rightward return movement of the retainer 43 relative to the rod 40 because of the biasing force of the spring 56. Although the rightward movement of the cam members 45 is stopped when the second retainer means 46 reaches its neutral position, the retainer 43 still moves rightwardly under the biasing force of the return spring 12 and the wire cable 15 so that the first cam surfaces 50 of the retainer 43 are brought into contact with the first portions 52 of the cam members 45 to establish engagement between the racks 49 of the cam members 45 and the racks 49 of the rod 40. Thereafter, cam members 45, the leaf springs 47, the second retainer means 46, and the rod 40 will move rightwardly together with the retainer 43 so that the clutch release bearing 20 is spaced from clutch release lever 26 by the predetermined distance.

Figure 3:
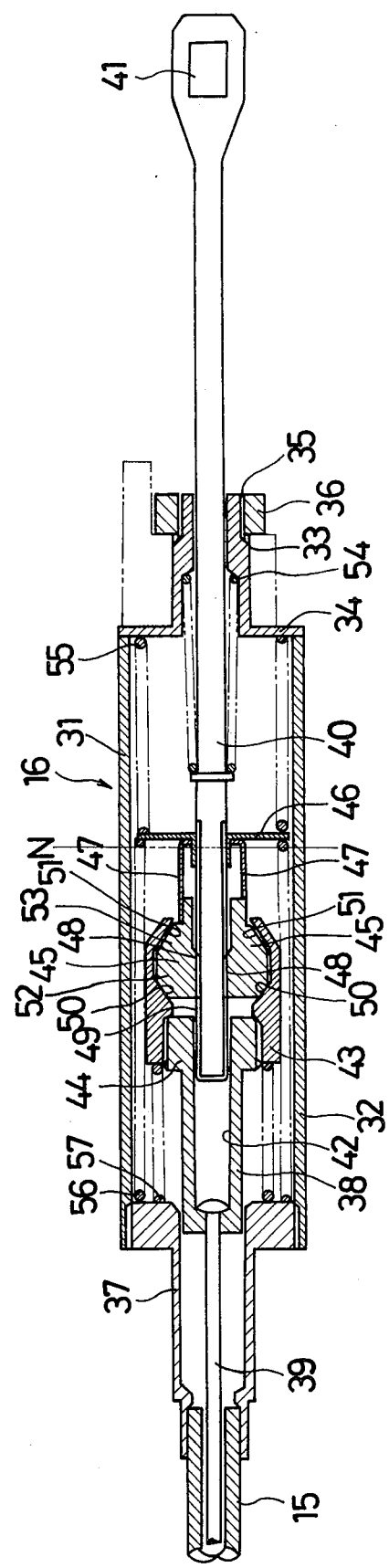
FIG. 3 is a cross-sectional view of another embodiment of the self-adjusting release mechanism of the clutch assembly of FIG. 1.

Referring now to another preferred embodiment shown in FIG. 3, the parts of the self-adjusting mechanism that are similar to those of the preferred embodiment of FIG. 2 are indicated by the same reference numerals. Since the operation of this embodiment is the same as the embodiment shown in FIG. 2, no further detailed explanation is made below.

In this embodiment, the self-adjusting mechanism 16 further comprises third spring means for urging the wire cable 15 to a taut condition. Preferably, the third spring means has a spring 57 inserted between the end cable 37 and the retainer 43. The spring 57 biases the retainer 43 toward the right so that the wire 39 of the wire cable 15 is always in its tense or pulled condition. The biasing force of the spring 57 thus maintains the retainer 43 at a predetermined position to thereby assure the engagement between the retainer 43 and the cam members 45. This results in the second retainer means 46 being positioned at its desired predetermined position to ensure a proper self-adjusting function of the clutch assembly.

It can be seen from the foregoing that the self-adjusting release mechanism minimizes an idle or accidental actuating stroke of the clutch pedal 10 because the wire 39 is always in its taut or pulled condition. If the spring 57 is selected to have a considerably large biasing force, the arrangement of the return spring 12 of the actuating means 5 may be omitted.

It can be further seen from the foregoing that the self-adjusting release mechanism is actuated by a relatively small manipulating or depression on the clutch pedal 10 and that the number of sliding engageable elements is minimized.

It will be apparent to those skilled in the art that various modifications and variations could be made in the clutch assembly of the invention without departing from the scope or spirit of the invention.

What is claimed:

1. A clutch assembly for connecting driving and driven shafts comprising:
   a. clutch means for normally effecting a driving connection between said shafts;
   b. clutch release levers actuable for disengaging the driving connection normally effected by said clutch means between said shafts;
   c. clutch release bearing means normally spaced from said release levers and engageable with said release levers for effecting the disengagement of the driving connection between said shafts;
   d. means for actuating the clutch assembly; and
   e. means for automatically adjusting the space between said clutch release levers and said clutch release bearing means to a predetermined distance, said automatically adjusting means including:
      i. a housing;
      ii. first retainer means mechanically connected to said actuating means and movably disposed in said housing, said first retainer means having a hollow portion therein open at least one end and cam surfaces positioned on the inner surface of said hollow portion;
      iii. a rod member for moving said clutch release bearing means relative to said clutch release levers, said rod member having a first portion with one end mechanically connected to said clutch release bearing means and a second portion disposed in said housing with one end movably positioned into said hollow portion through said open end of said first retainer means;
  iv. at least one cam means disposed in said hollow portion between said first retainer means and said rod member for selective engagement and disengagement with said rod member in response to the relative movement between said cam means and said first retainer means, said cam means being urged into engagement with said rod member when acted upon by said cam surfaces of said first retainer means;
  v. leaf spring means connected to said cam means for urging said cam means outwardly away from said rod member;
  vi. second retainer means movably positioned in said housing, slidable relative to said rod member, and operatively connected to said cam means by said leaf spring means;
  vii. a pair of springs positioned in said housing for acting on opposing sides of said second retainer means, the biasing forces of said pair of springs being balanced when said second retainer means is in a predetermined neutral position; and
  viii. spring means for biasing said rod member in the clutch disengaging direction.

2. A clutch assembly as set forth in claim 1, wherein said first retainer means has first and second cam surfaces and wherein said cam means comprises a pair of cam members, each having first and second portions engageable respectively with said first and second cam surfaces, and wherein said rod member and cam members have racks for engagement with each other upon interaction of said cam surfaces of said first retainer means with said portions of said cam members.

3. A clutch assembly as set forth in claim 2, wherein said first and second cam surfaces are spaced from each other by a predetermined distance, said cam members' racks being disengaged from said rod member's racks by said leaf spring means when said first and second cam surfaces of said first retainer means are not interacting respectively with said first and second portions of said cam members.

4. A clutch assembly as set forth in claim 1 further comprising a wire for mechanically connecting said first retainer means to said actuating means, and spring means for urging said wire to a taut condition, said first retainer means thereby being urged to a predetermined position.

5. A clutch assembly as set forth in claim 3 further comprising a wire for mechanically connecting said first retainer means to said actuating means, and spring means for urging said wire to a taut condition, said first retainer means thereby being urged to a predetermined position.

6. A clutch assembly for connecting driving and driven shafts comprising:
  a. clutch means for normally effecting a driving connection between said shafts;
  b. clutch release levers actuable for disengaging the driving connection normally effected by said clutch means between said shafts;
  c. clutch release bearing means normally spaced from said release levers and engageable with said release levers for effecting the disengagement of the driving connection between said shafts;
  d. means for actuating the clutch assembly;
  e. a wire; and
  f. means for automatically adjusting the space between said clutch release levers and said clutch release bearing means to a predetermined distance, said automatically adjusting means including:
    i. first retainer means mechanically connected to said actuating means by said wire and having a hollow portion therein open at least at one end;
    ii. a rod member mechanically connected to said clutch release bearing means for moving said clutch release bearing means relative to said clutch release levers and having a portion positioned through said open end of said first retainer means;
    iii. cam means disposed in said hollow portion between said first retainer means and said rod member for selective engagement and disengagement with said rod member in response to the relative movement between said cam means and said first retainer means, said cam means being under bias toward disengagement from said rod member;
    iv. first spring means for urging said cam means to a predetermined position when said cam means is disengaged from said rod member;
    v. second spring means for biasing said rod member in the clutch disengaging direction; and
    vi. third spring means for urging said wire to a taut condition, said first retainer means thereby being urged to a predetermined position.

7. A clutch assembly for connecting driving and driven shafts comprising:
  a. clutch means for normally effecting a driving connection between said shafts;
  b. clutch release levers actuable for disengaging the driving connection normally effected by said clutch means between said shafts;
  c. clutch release bearing means normally spaced from said release levers and engageable with said release levers for effecting the disengagement of the driving connection between said shafts;
  d. means for actuating the clutch assembly; and
  e. means for automatically adjusting the space between said clutch release levers and said clutch release bearing means to a predetermined distance, said automatically adjusting means including:
    i. first retainer means mechanically connected to said actuating means and having a hollow portion therein open at least at one end and cam surfaces positioned on the inner surface of said hollow portion;
    ii. a rod member mechanically connected to said clutch release bearing means for moving said clutch release bearing means relative to said clutch release levers and having a portion positioned through said open end of said first retainer means;
    iii. cam means disposed in said hollow portion between said first retainer means and said rod member for selective engagement and disengagement with said rod member in response to the relative movement between said cam means and said first retainer means, said cam means being under bias toward disengagement from said rod member and being urged into engagement with said rod member by said cam surfaces of said first retainer means;

iv. first spring means for urging said cam means to a predetermined position when said cam means is disengaged from said rod member;
v. second spring means for biasing said rod member in the clutch disengaging direction; and
vi. leaf spring means for providing the bias of said cam means toward disengagement from said rod member.

8. A clutch assembly for connecting driving and driven shafts comprising:
   a. clutch means for normally effecting a driving connection between said shafts;
   b. clutch release levers actuable for disengaging the driving connection normally effected by said clutch means between said shafts;
   c. clutch release bearing means normally spaced from said release levers and engageable with said release levers for effecting the disengagement of the driving connection between said shafts;
   d. means for actuating the clutch assembly; and
   e. means for automatically adjusting the space between said clutch release levers and said clutch release bearing means to a predetermined distance; said automatically adjusting means including:
      i. first retainer means mechanically connected to said actuating means and having a hollow portion therein open at least at one end;
      ii. a rod member mechanically connected to said clutch release bearing means for moving said clutch release bearing means relative to said clutch release levers and having a portion positioned through said open end of said first retainer means;
      iii. cam means disposed in said hollow portion between said first retainer means and said rod member for selective engagement and disengagement with said rod member in response to the relative movement between said cam means and said first retainer means, said cam means being under bias toward disengagement from said rod member;
      iv. second retainer means slidable relative to said rod member and operatively connected to said cam means;
      v. first spring means for urging said cam means to a predetermined position when said cam means is disengaged from said rod member, said first spring means including a pair of springs acting on opposing sides of said second retainer means, the biasing forces of said pair of springs being balanced when said second retainer means is in a predetermined neutral position; and
      vi. second spring means for biasing said rod member in the clutch disengaging direction.

9. A clutch assembly as set forth in claim 8 further comprising a wire for mechanically connecting said first retainer means to said actuating means, and spring means for urging said wire to a taut condition, said first retainer means thereby being urged to a predetermined position.

* * * * *

UNITED STATES PATENT AND TRADEMARK OFFICE
CERTIFICATE OF CORRECTION

PATENT NO. : 4,057,135
DATED : November 8, 1977
INVENTOR(S) : Masanori Mori

It is certified that error appears in the above-identified patent and that said Letters Patent are hereby corrected as shown below:

Title page under Foreign Application Priority Data

The Application No. "50-12939" filed September 19, 1975 should be changed to read --50-129396--.

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*